UNITED STATES PATENT OFFICE.

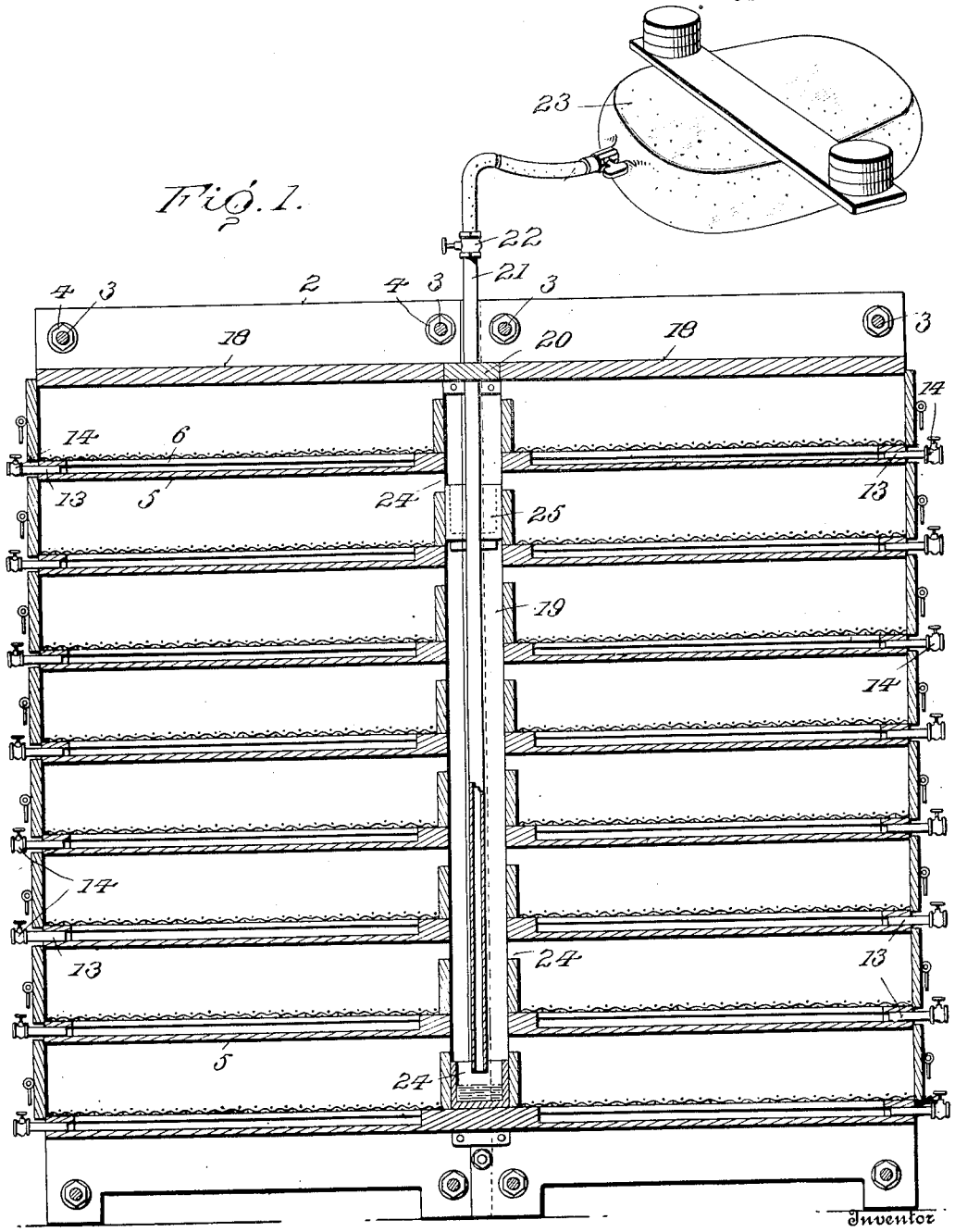

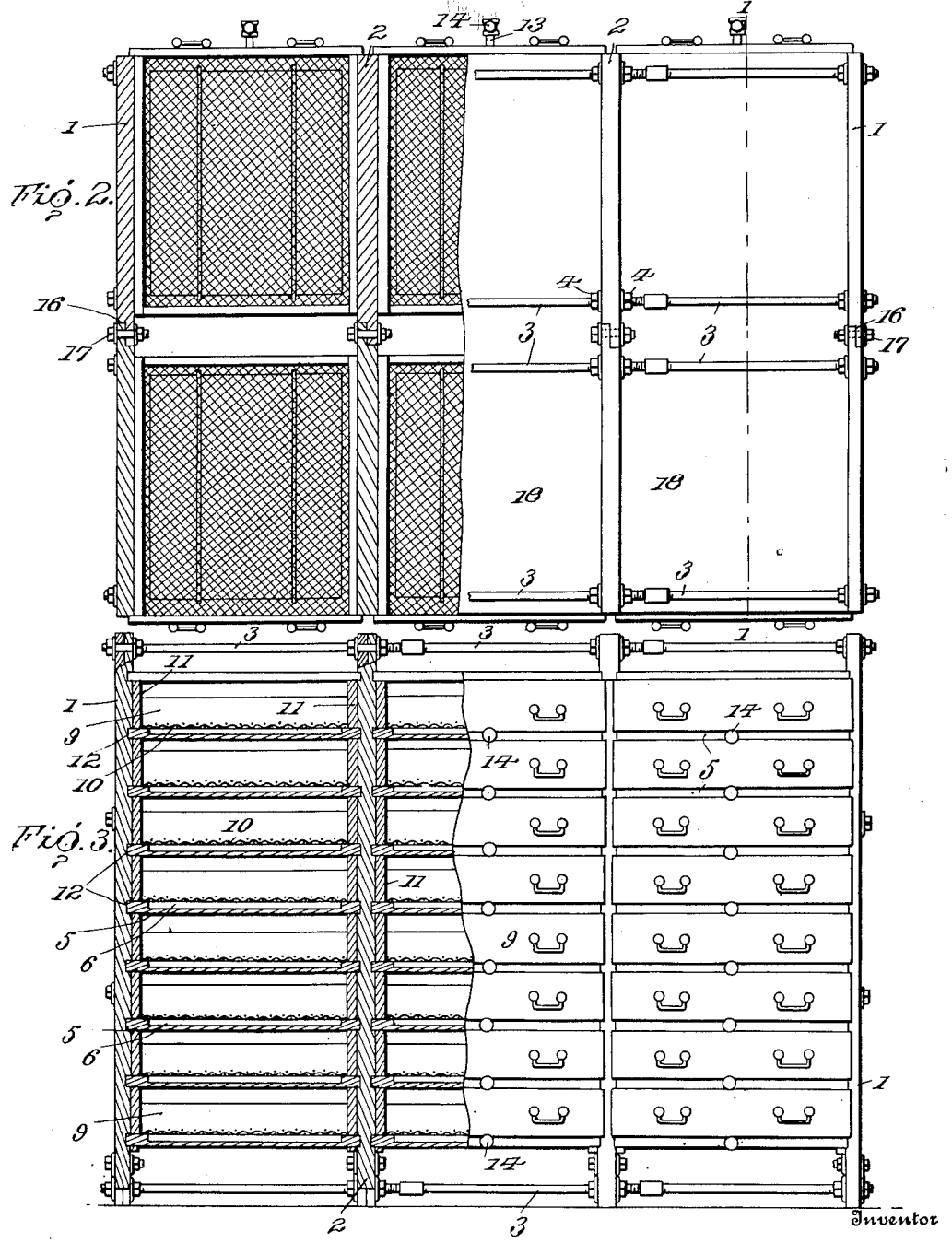

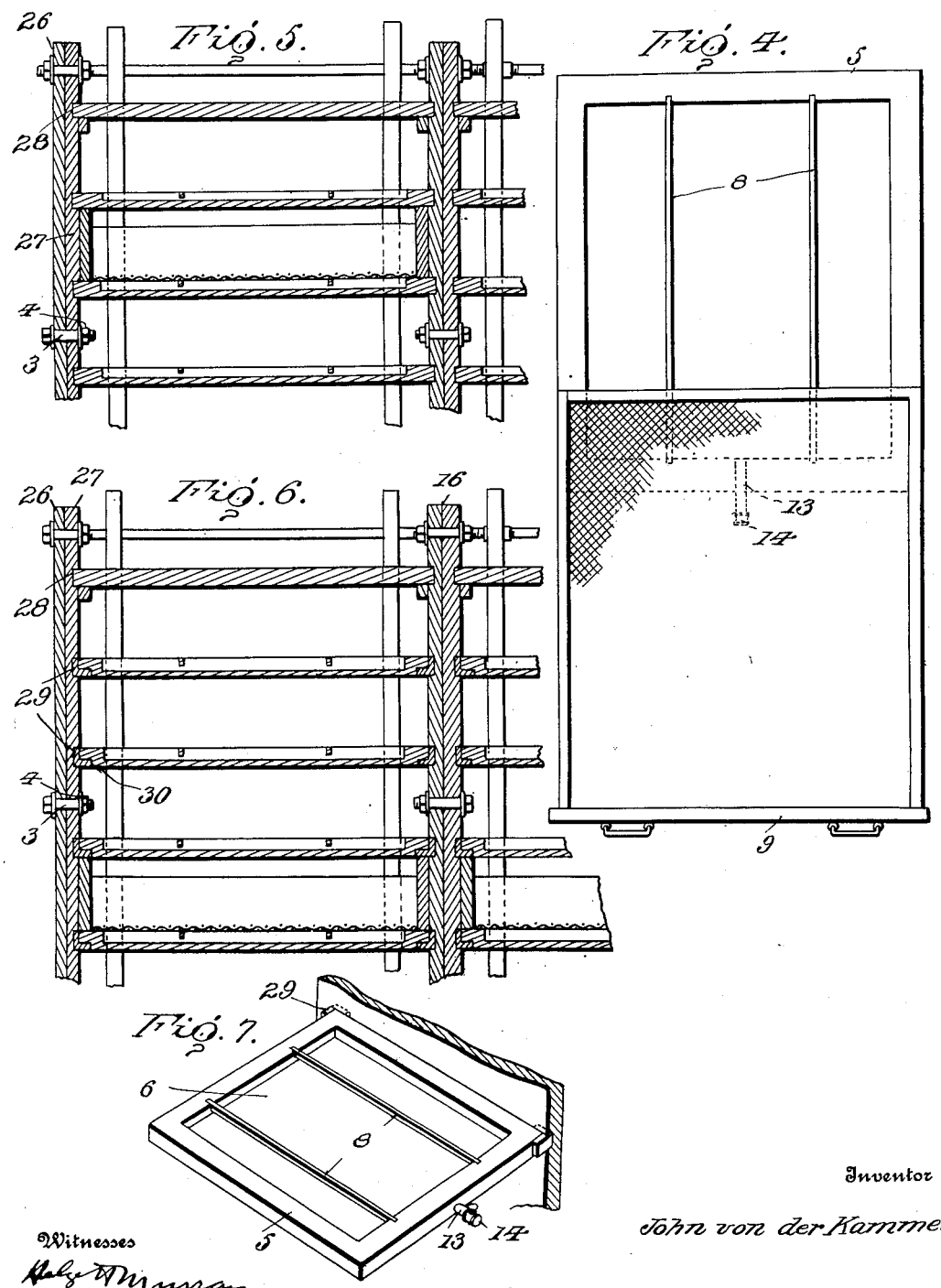

JOHN VON DER KAMMER, OF WASHINGTON, DISTRICT OF COLUMBIA, ASSIGNOR TO BERTHA VON DER KAMMER, OF WASHINGTON, DISTRICT OF COLUMBIA.

METABOLIZER.

No. 891,176.   Specification of Letters Patent.   Patented June 16, 1908.

Application filed April 7, 1908. Serial No. 425,774.

*To all whom it may concern:*

Be it known that I, JOHN VON DER KAMMER, citizen of the United States, residing at Washington, District of Columbia, have invented certain new and useful Improvements in Metabolizers, of which the following is a specification.

My invention relates to an improved means for the metabolism of vegetable seeds and the artificial growth of plants therefrom without soil, to the extent of lateral root formation and stem development thereon, and to a condition of growth commonly known as seedlings. Young plants so developed and with the endosperm still attached constitute a very valuable food both for man as well as for domestic animals, the dry components of the dormant seed being changed by such metabolism and growth, and the plants when eaten enter the digestive organs in aqueous and assimilable live-plant form, resulting in improved digestion and increased nutrition and correspondingly enhanced health. The feeding of such plants as stock food for animals also produces a marked improvement in the quality of the meat, as well as other animal food products.

As the result of my experiments I have found that the metabolism of seed and the growth of plants therefrom may be accomplished without soil in an inclosure in which the presence and action of atmospheric air is restricted and suppressed, and the seed practically surrounded by an anaerobic atmosphere in conjunction with artificial nutrition. I have also found that if such an anaerobic atmosphere is maintained and the usual nutritive salts are available, bacteria of an anaerobic character originate from the seed coats and develop and multiply on the organic matter oozing from the seed itself. The bacteria, however, thrive better if additional organic matter is supplied, such organisms serving to prevent fermentation and toxicity of the growing mass of seed. I have also found that if such an anaerobic atmosphere is maintained and the usual nutritive salts and organic matter are available in the growing chamber, nitrogen fixing bacteria or fungi when inserted in the chamber multiply therein and aid in the nutrition or the growing plants, if gases of a nitrogen character, or in combination with other gases or artificial fertilizing solutions, are also added or made available. The young plants so produced may, if desired, be planted in the ground where they will continue to grow in a natural manner, or they may be used in their then condition as food for human beings or for stock, or may be canned for future use as in the well known manner used in canning vegetables.

I do not aim to provide specific soil bacteria for performing specific actions or results, but subject the seeds to the bacteria flora of a fertile soil such as will thrive in an artificial culture under anaerobic conditions.

Describing the culture of the bacteria, I dissolve two hundred gr. potassium phosphate in ten thousand C. C. water into which is stirred one hundred and fifty gr. calcium carbonate and the entire liquid is siphoned off after settling. Into this I put two hundred gr. of dextrose and five hundred gr. of an extraction from a mixture of germinated seeds, preferably wheat, corn and vetches, which has been filtered and sterilized. All of this is put into a vessel having an air tight cover and preferably of stone-ware, as glass or metal vessels are not well suited for the purpose. In the meantime an extraction of black pasture soil has been prepared in the following manner: To approximately two gallons of water I add enough of the black pasture soil to make a semi-liquid mass. After twenty-four hours I decant the water and allow it to precipitate when it is conveyed into a tightly covered vessel, when it is ready for use. I have found that the bacteria obtained from black pasture soil is well adapted for my purpose, the anaerobic conditions surrounding the bacteria in this character of soil more closely approximating the conditions to which such bacteria are to be subjected in the apparatus which I employ. The extraction so prepared is then added to the previous liquids and the entire mixture is then made neutral, preferably slightly alkaline, by adding a sufficient amount of an extraction of wood ashes. The liquid is then placed in a tightly covered vessel, and remains therein for about four days in a temperature of about 35° C. In about four days the liquid becomes turbid, which shows the degree of development of the micro-organisms; in the general practice, especially in large plants, the operator will be guided by the turbidness of the liquid in his operations.

For each new batch of grain a supply of this liquid is put in the tray-like depressions of the apparatus, but the waste liquids from the apparatus containing valuable extractions are collected, filtered by vacuum pump, sterilized, and used over and over again in the continuous culture of organisms.

The liquids directly used on the seed I prepare from a solution of potassium phosphate, carbonate of lime and commercial fertilizers containing soluble potassium, free phosphoric acid and nitrogen, also neutralized by an extract of wood-ashes and which is put into a tank holding water at a proportion of one part of liquid to five thousand of water, which means the combined weight of the dissolved chemicals to the weight of the water.

The condition of the micro-organisms which indicates that for one reason or another they have become spoiled is shown by a slimy touch of the seed. In such case a new carefully prepared culture must be obtained and the apparatus thoroughly cleaned.

A microscopical examination of the organisms shows from round to rod-like ramifying bodies arranged in different formations and groups and among which can be detected well known specific forms, but to which in my practice I do not pay specific attention.

The main purpose of the use of the micro-organisms and the chemical means employed by me is the accomplishing of the proteolysis of the seed, which result I have found to be thereby effected.

Cultures of bacteria of divers description, and for the purpose of inoculating seed of the legumes, or the soil in which they are to be planted, are now distributed by agricultural institutions and are sold in the market as merchandise and which in a further culture under anaerobic conditions, especially in a culture containing extracts of germinated seed, as I have set forth, may be usefully employed in connection with my apparatus.

I have designed a metabolizer constructed of non-porous, non-absorbent material, to prevent the formation therein of malign organisms or the absorbing of moisture thereby, and of a material which will not be affected by nor affect the gases and chemical solutions employed by me in the metabolizing of the seeds placed therein. As the anaerobic conditions within the structure would prevent an attendant entering the same, I have constructed a metabolizer which can be attended to and taken care of from without, and which consists preferably of a plurality of anaerobic growing chambers arranged in series, one above the other.

In my preferred construction, as shown in the accompanying drawings, all the anaerobic inclosures join with one single gas chamber for the purpose of expediency.

The fluid-tight basin in the bottom of the inclosure holds the nutritive solutions and sustains the degree of moisture necessary for the process, and occasional douching of the seed is sufficient. The seeds to be metabolized under this process should not be steeped or soaked for any length of time, as this would cause the loss of the bacteria from the seed coats and the organic matter on which they multiply. The gas chamber serves for holding the gases, which may be furnished from a reservoir or gas-bag from without the chamber or may evaporate from liquids, which may be put in receptacles on the bottom of the gas chamber, or in very large metabolizers, the lower or any other removable seed holder may contain an ordinary vessel holding sufficient material for generating gas. The gas which I employ is free nitrogen or in combination with traces of other gases as they appear in the production of same, and which are produced in any desired manner.

Oxygen absorbent material such as pyrogallic acid in an alkaline solution may be put in vessels and hung up in the gas chamber, but if the apparatus is constructed as specified and the seed drawers are tightly closed I have found this expedient unnecessary.

It will be understood that while the seeds should be kept in a moist condition the anaerobic atmosphere in the chambers should be comparatively dry, that is to say, not laden with water vapors to such an extent as to cause the seeds to become water logged.

A single metabolizer unit would comprise an anaerobic inclosure or chamber having a fluid-tight basin in its bottom and a seed receptacle and a gas chamber.

Referring to the drawings wherein I show the preferred form of my invention and wherein the same part is designated by the same reference numeral wherever it occurs, Figure 1 is a central cross section of the preferred form of my invention taken on line 1, 1 of Fig. 2; Fig. 2 is a top view partly broken away; Fig. 3 is a front elevation partly broken away; Fig. 4 is a plan view of a drawer and its support with the drawer in its open or partly withdrawn position; Fig. 5 is a detail sectional view showing a modification and Fig. 6 is a view similar to Fig. 5, showing, however, a slightly different form of construction from that illustrated in Fig. 5; Fig. 7 is a detail perspective view of the form of drawer support shown in Fig. 6.

1, 1 are a pair of side plates preferably formed of soapstone or other non-porous material, and 2, 2 are a pair of interior plates similar to the side plates 1. These plates are tied together and held in parallel relation by means of the rods, 3, 3 passing through the plates at top and bottom and secured to the plates by means of the nuts 4 working on the rods.

Between the plates 2 are secured a series of drawer supports 5 which are substantially rectangular in shape and provided with the central depression 6, preferably rectangular in form, as best shown in Fig. 7.

8 are a pair of rods extending across the central depression 6 to support the middle portion of the drawers 9, which are of ordinary form except that they have their bottom 10 formed of wire gauze or other reticulated material. The supports 5 and the side 11 of the drawers are also preferably formed of soapstone.

The drawer supports 5 in the form of construction shown in Figs. 1 to 3 inclusive and as best shown in Fig. 3, are supported in position by cutting grooves 12 in the sides of the plates 1 and 2 into which the edges of the supports enter. A draw-off pipe 13 having a stop cock 14 extends through the front side of the support and enters the bottom of the depression 6, whereby should there be too much liquid in the depression the same can be withdrawn. The plates 1 and 2 forming a single drawer cabinet are extended at their rear ends and cut away as shown at 16. Two of these cabinets similarly constructed are then placed back to back and the projecting edges of the plates 1 and 2 secured together by means of the bolts 17, thus forming a complete rectangular cabinet having a space between the inner ends of the drawers of the oppositely disposed sections.

18 are the cover plates, one of which extends over each of the oppositely disposed sections and the space 19 between the inner ends of the sections so closed by a plate 20, so that the top of the apparatus is air-tight. Extending down through the plate 20 and down into the space 19 is a pipe 21 provided with a valve 22 at its upper end, to which is suitably connected a gas containing device 23, which is shown in the form of a bag, though it is to be understood that any other form of gas container may be substituted therefor. The pipe 21 extends down nearly to the bottom of the space 19, and in the bottom of the space I have shown a trough 24 which, if desired, may contain gas-producing liquid to augment the gas supplied by the pipe 19. It will of course be understood that gas may be supplied by the pipe 19 alone or from liquid in the trough 24 alone, or one may be used to supplement the other. As is best shown in Fig. 1, the backs of the drawers do not extend up so as to contact with the surface of the support for the drawer above, but there is a space 24 left through which the gas can readily pass from the space 19 into the drawers and over the mass of material being sprouted.

In the upper portion of the space 19 I have shown a container or trough 25 in which a suitable oxygen absorbent, such as pyrogallic acid in an alkaline solution may be placed, in order to take up any oxygen which might otherwise leak into the apparatus.

In Figs. 5 and 6 I have shown a modification of the side plates 1, 2, in that they consist of a pair of plates 26, 27 held together by the stay rods 3 and nuts 4. In this form of construction the plates 26, 27 are provided with grooves 28 into which the drawer supports extend.

In Figs. 6 and 7 I have shown a further modification in that the drawer supports rest upon projecting brackets 29 secured in the sides of the side plates, these brackets projecting into suitable cut away corners 30 of the drawer supports.

In the operation of my device the drawers are filled with a layer of the seeds, tubers or bulbs to be treated, the mass to be metabolized resting upon the reticulated bottoms 10 of the drawers. The front of the drawers fit tightly between the drawer supports so as to close the front of the casing. Sufficient moisture is sprinkled upon the mass. Gas suitable for assisting the process is now introduced through the pipes 21 passing into the space 19, and from thence through the openings 24 over the mass of material, Whenever there is more moisture than is necessary in the depression 6 of the drawer supports it can readily be withdrawn through the pipes 14.

I realize that considerable variation is possible in the details of construction and arrangement of parts without departing from the spirit of my invention, and I therefore do not intend to limit myself to the specific form shown and described.

I claim:—

1. A metabolizer for the artificial development of plant life from seed, comprising an anaerobic chamber, means therein for holding the seed, and means therein for holding the nutrient media.

2. In a metabolizer for the artifical development of plant life from seed, the combination with a chamber closed against the outer atmosphere, of means therein for holding the seed, means therein for holding the nutrient media, and means for supplying an anaerobic gas to said chamber.

3. A metabolizer, comprising an anaerobic chamber having a tray-like depression in its bottom, and a removable seed holder adapted to be inserted in said chamber and supported over said depression.

4. A metabolizer comprising an anaerobic chamber formed from non-porous, non-absorbent material, a removable seed holder having a reticulated bottom and adapted to be inserted in said chamber and supported above the bottom thereof, and a compartment below said seed holder to contain water or other seed nutrient.

5. A metabolizer built in sections and from non-porous, non-absorbent material, each section containing a series of anaerobic chambers and each having an open back, means for securing said section in back-toback relation whereby an opening is left between the two.

6. In a metabolizer built up of non-porous, non-absorbent material and forming a series of anaerobic chambers each having a tray-like depression in its bottom, drawers having reticulated bottoms for receiving the material to be treated and adapted to be inserted in such chambers and supported therein and over said depressions, whereby said tray-like depressions beneath said drawers are adapted for the reception of water or other nutrient media.

In testimony whereof I affix my signature in presence of two witnesses.

JOHN VON DER KAMMER.

Witnesses:
  FRANCIS M. PHELPS,
  E. L. WHITE.